June 17, 1969  D. H. RICHTER ETAL  3,449,843
SIX DEGREE OF FREEDOM APPARATUS
Filed Aug. 3, 1966  Sheet 1 of 2
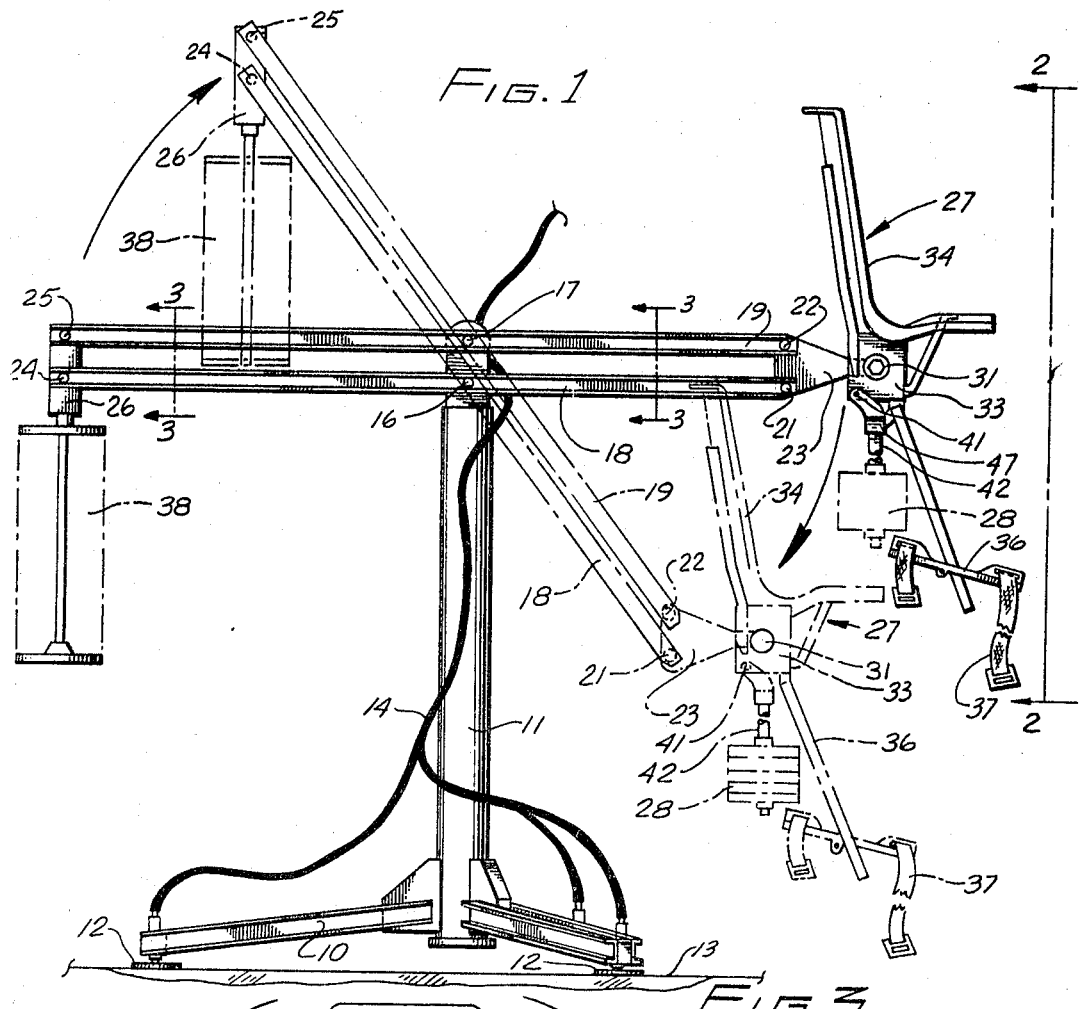
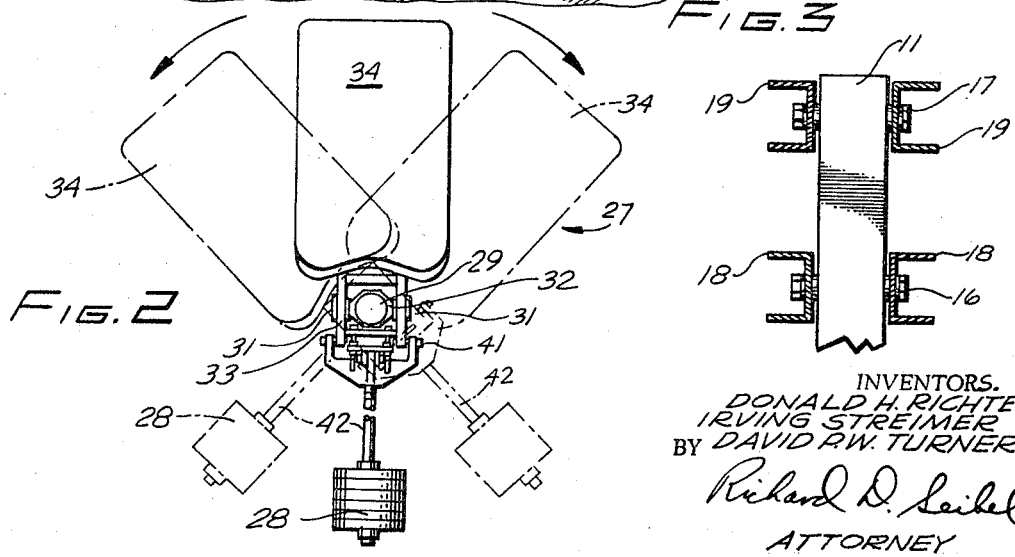
INVENTORS.
DONALD H. RICHTER
IRVING STREIMER
BY DAVID R.W. TURNER
Richard D. Seibel
ATTORNEY

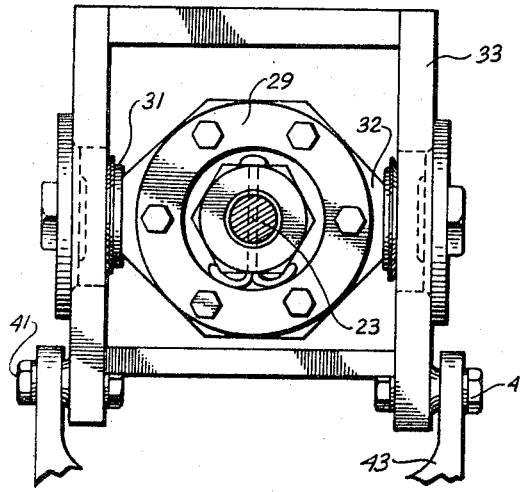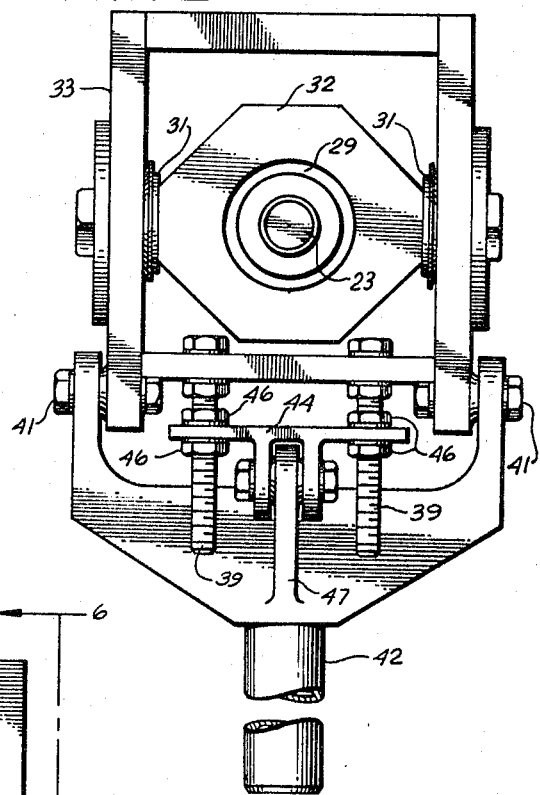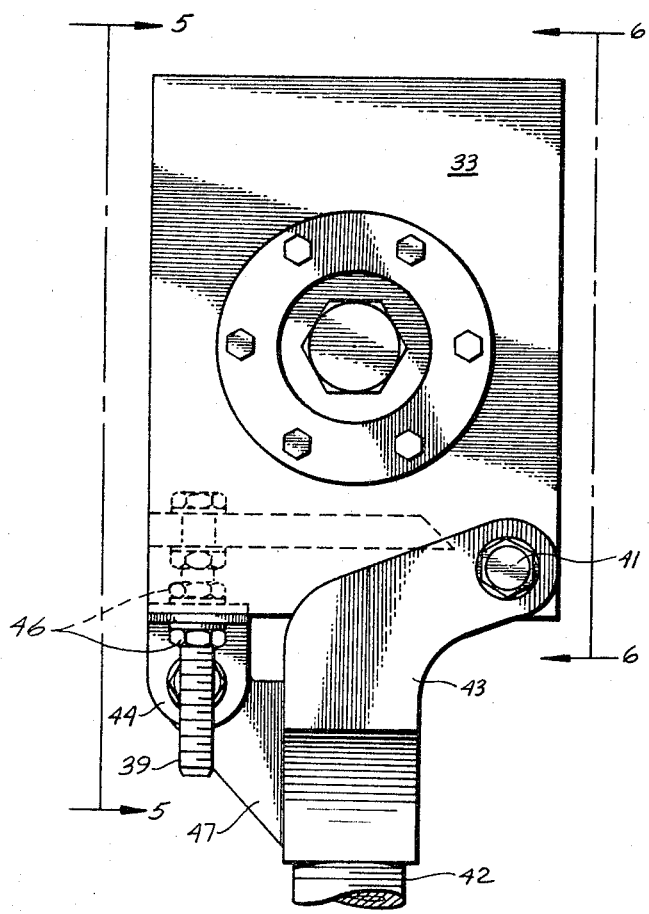

United States Patent Office 3,449,843
Patented June 17, 1969

3,449,843
SIX DEGREE OF FREEDOM APPARATUS
Donald H. Richter, La Mirada, Irving Streimer, Northridge, and David P. W. Turner, Canoga Park, Calif., assignors to North American Rockwell Corporation
Filed Aug. 3, 1966, Ser. No. 570,059
Int. Cl. G09b 9/08; A63g 1/32
U.S. Cl. 35—12                    9 Claims

ABSTRACT OF THE DISCLOSURE

A simulator of zero gravity is described, characterized by very low mass and great freedom of motion in all six degrees. The simulator comprises a base supported by air-bearing pads for providing three degrees of freedom. A vertically extending column on the base has a pair of vertically displaced low friction bearings at its upper end and a pair of beams mounted thereon at their midpoints. A support member at the end of the beams forms a parallelogram for large vertical displacements of the beam ends without change in orientation of the support member. Roll and pitch bearings on the support member thus have uniform orientation despite changes in vertical displacement. The roll and pitch bearings support an operator seat. A counterweight below the seat adjusts the center of gravity of the combined seat and operator assembly to the centers of rotation of the pitch and roll bearings. A counterweight at the other end of the parallelogram beam brings the center of gravity of the simulator vertically in line with the column and maintains the apparatus in equipoise.

This invention relates to apparatus having both rotation and translational freedom about three axes and in particular relates to simulation of zero gravity for an operator seated therein.

In order to investigate the efforts required by astronauts in zero gravity environments and the ability to perform work, and evaluate the changes in metabolic rates and energy required in performing work in zero gravity, it is desirable to support test operators so as to have six degrees of freedom of motion; namely two directions of translation in a horizontal plane, translation in a vertical plane, rotation about a vertical axis and rotation about each of two horizontal axes. A person in such an apparatus exerting force on a fixed or relatively fixed object is capable of producing force on the object and has counteracting motions closely simulating those occurring in a zero gravity environment. Such an apparatus cannot only be employed in research but can also be used as a task trainer for astronauts who will be working in zero gravity. A similar unmanned unit can be employed to simulate other objects in zero gravity such as, for example a work station for an astronaut.

Six degree of freedom simulators for zero gravity studies have been devised in the past but have been extremely heavy and the inertial characteristics of the simulator have clouded the energy and force determinations made with such simulators. Thus, for example, a five degree of freedom simulator previously constructed has a weight of 4300 pounds and a six degree of freedom simulator built has a total weight of about 51,000 pounds. The reactions of such a simulator to the forces exerted by the operator are totally unrealistic and are virtually useless for task training. In a true zero gravity environment the isometric and inertial characteristics of the man and his equipment may be the only resisting force available for performing work. It is apparent that a simulator weighing, for example, 4300 pounds or from 20 to 30 times the weight of a man alone, will have radically different inertial characteristics than a man alone and cannot closely simulate the effects of zero gravity. A simulator with a mass of 51,000 pounds or almost 300 times as heavy as a man is virtually useless. In order to provide an accurate simulation of zero gravity it is therefore desirable to provide a six degree of freedom simulator having a very low total mass. In this way the inertial characteristics of the simulator are minimized and experiments can readily be performed wherein the mass of the simulation apparatus is effectively eliminated.

It is therefore a broad object of this invention to provide a light weight zero gravity simulator.

Thus in the practice of this invention according to a preferred embodiment there is provided a base levitated by air bearing pads on a smooth floor. The air bearing pads provide a very low friction support for the base on the flood and thereby provide two degrees of translational freedom in a horizontal plane and one degree of rotational freedom about a vertical axis. The base comprises a column vertically extending from three legs that have the air pads at the ends thereof. Two low friction bearings are located at the top of the column. An elongated parallelogram beam arrangement is mounted with the midpoints of two of the beams on the bearings so that vertical translation is obtained at the ends of the parallelogram upon pivoting of the beams on the bearings. Since the midpoints of the long parallelogram beams remain in a vertical line, the beam ends also remain vertical despite displacement in a substantially vertical direction.

A seat for an operator is mounted on one end of the parallelogram beam arrangement with two pivot points located beneath the seat to provide two degrees of rotational freedom for the seat in the directions of pitch and roll relative to an operator seated in the seat. A counterweight provided beneath the seat adjusts the center of gravity of the seat assembly and operator so that the combined center of gravity s substantially at the centers of rotation of the bearings supporting the seat. A counterweight is provided at the other end of the parallelogram beam from the seat so that the combined center of gravity of the seat assembly and operator and the counter-weight is substantially at the mid point of the parallelogram beams. Such an apparatus, constructed of aluminum and other light weight materials, provides a six degree of freedom simulator which weighs only 730 pounds including a 185 pound operator, for a mass ratio of about 4.0. By adding weight to the simulator base, the mass ratio is readily varied for extrapolation to mass ratios found in astronauts in space.

Thus it is a broad object of this invention to provide a light weight simulator.

It is another object of this invention to provide an experimental technique for minimizing simulator inertial effects.

It is a further object of this invention to provide a six degree of freedom apparatus.

Other objects and many of the attendant advantages of this invention will be readily appreciated as the same becomes better understood from the following detailed description and the accompanying drawings wherein:

FIG. 1 illustrates a side view of a six degree of freedom simulator constructed according to the principles of this invention;

FIG. 2 illustrates an end view of a seat assembly for the simulator of FIG. 1;

FIG. 3 is a cross section through a parallelogram beam assembly of the simulator of FIG. 1;

FIG. 4 is a rear view of a seat support assembly for the simulator of FIG. 1;

FIG. 5 is a front view of the seat support assembly; and

FIG. 6 is a side view of the seat support assembly.

Throughout the drawings like reference numerals refer to like parts.

FIG. 1 illustrates a six degree of freedom simulator constructed according to the principles of this invention. As illustrated in this embodiment there is provided a three-legged base 10 rigidly supporting a vertically extending tubular column 11. At the extremities of the legs of the base 10 there are provided conventional air bearing pads 12. By providing a three legged base and upstanding columnar support, a very low weight is obtained in the simulator. The air bearing pads are on an extremely smooth floor 13 such as, for example, a large sheet of plate glass for providing extreme smoothness and flatness. The air bearing pads are commercially available devices wherein compressed air is supplied from an external source (not shown) by way of a hose 14 to each of the air bearing pads. The flow of air from the air bearing pads supports the weight of the simulator above the plate glass and provides an extremely low friction support for a simulator. It is found, for example, that a 730 pound simulator can be placed in motion by the application of a four inch-lb. force at the simulator center of mass. In accordance with the laws of levers proportionately less force is required as the distance from the center of rotation and translation increases.

At the upper end of the column 11 there are provided lower and upper bearings 16 and 17 respectively. The bearings 16 and 17 and other bearings hereinafter described are preferably ball or roller bearings having extremely low friction. It will be appreciated that fluid bearings or the like can also be employed for minimizing friction. The two bearings 16 and 17 are vertically spaced apart on the column and each has a horizontally extending axis. Mounted on the lower bearing 16 for pivotal motion about their mid-points is a pair of parallel beams 18, one of which is hidden by the other in FIG. 1 but is shown in FIG. 3. The pivotal motion and resultant vertical displacement of the ends of the beams is illustrated in phantom in FIG. 1. A pair of upper beams 19, one of which is also hidden by the other in FIG. 1, is supported for pivotal motion about their mid-points on the upper bearing 17. Aluminum channel members mounted with the webs adjacent the support column 11 are found to provide a rigid, lightweight structure for the four beams 18 and 19.

A bearing 21 having a horizontal axis is provided at one end of the pair of lower beams 18. This end for purposes of exposition will be referred to hereinafter as the front end of the beam, the simulator, or other elements hereinafter described. A similar pivot bearing 22 is provided at the front end of the pair of upper beams 19. A rigid front support member 23 is mounted between the pairs of beams on both of the bearings 21 and 22 so that the bearings are at a fixed distance apart. The distance between the bearings 21 and 22 is the same as the distance between the bearings 16 and 17 at the mid-points of the beams 18 and 19 respectively. Similarly at the rear end of the beams 18 and 19 respectively there are provided pivot bearings 24 and 25 and a rear support member 26 mounted on the bearings for pivotal motion. The bearings 24 and 25 are held a fixed distance apart by the support member 26 and the fixed distance is the same as the distance between the bearings 16 and 17 at the midpoints of the beams 18 and 19 respectively.

Thus the parallel beams 18 and 19 and the front and rear support members 23 and 26 respectively form a parallelogram beam assembly having mid-points of the long sides of the parallelogram pivotally mounted in a vertical plane on the bearings 16 and 17. This can also be considered as two similar parallelograms having one side, namely between the bearings 16 and 17, in common. Thus as the parallelogram beam assembly pivots from the position where the beams 18 and 19 are in a horizontal position into a position as illustrated in phantom in FIG. 1, the front and rear support members 23 and 26 respectively both remain parallel to each other and to the vertical column 11 and hence remain substantially vertical. By keeping the front support member 23 in a constant orientation, the pitch freedom of the operator is unimpaired as described in greater detail hereinafter.

A seat assembly 27 is mounted on the front support member 23 so that as the front support member 23 translates vertically with the parallelogram assembly, the entire seat assembly also translates vertically. This provides the degree of vertical translational freedom for the six degree of freedom simulator. The presence of a small horizontal component in the motion due to the arcuate path is of no consequence because of the light weight and ready horizontal translation of the simulator. A counter-weight 28 is provided on the rear support member 26 so that the weight of the seat assembly 27 and operator (not shown) in the seat is counterbalanced and the combined center of mass of the simulator plus operator is substantially at or directly below the center pivot bearings 16 and 17. Since the beams 18 and 19 are mounted at their mid-points, the mass of the system is symmetrically disposed and no anomolous inertia characteristics are encountered by an operator of the simulator.

As more clearly seen in FIGS. 4–6 the seat assembly 27 is gimballed on the front support member 23 by two low friction bearings 29 and 31 so that the seat assembly has two degrees of rotational freedom, namely pitch and roll relative to an operator seated in the simulator. The foot rest 36 is omitted from FIGS. 4–6 to add clarity to illustration of the gimbals. The roll bearing 29 is mounted on a horizontal axis between the front support member 23 and a yoke member 32. A pair of pitch bearings 31 are provided between the yoke bearing 32 and a seat support 33 so that the axis of rotation of the pitch bearings is normal to and through the axis of rotation of the roll bearing 29. In an application of the simulator to support an object for task training, the yoke can be a U shape, however, for heavy objects a heavy yoke is needed. Separate bearings for pitch and roll are preferred in order to obtain maximum freedom of rotational motion. A conventional ball joint has a very limited freedom of motion, usually 15 to 20° so that free motion is obtained only in a cone with an included angle of about 15 to 20°. On the other hand, by employing a double set of conventional pivot bearings for pitch and roll, a cone of free motion with an included angle in excess of 150° is readily obtained.

Mounted on the seat support 33 is a saddle type seat 34 which accommodates an operator during use of the simulator. A foot rest 36 is also mounted on the seat support 33 and foot straps 37 are provided on the foot rest 36 for fixing the operator's feet to the apparatus if desired.

It will be appreciated that seat belts, shoulder harnesses and the like (not shown) can also be provided on the seat for the purpose of minimizing danger to the operator. It will also be appreciated that knee and elbow pads, helmets and the like are useful accessories for minimizing the possibility of injury to an operator of such an apparatus.

A counter-weight 38 is provided on the seat support 33 below the seat 34 so that the weight of an operator can be counterbalanced. The counter-weight 38 can be adjusted by means of a pair of adjustment screws 39 so as to pivot around a pair of bolts 41 so that the angle between the counter-weight support rod 42 and the seat support 33 can be changed to accommodate differences in the center of gravity or different operators. A counter-weight support yoke 43 is pivotably mounted on the bolts 41 and is connected to the counter-weight support rod 42. A bracket 44 is mounted on the adjusting screws 39 between adjusting nuts 46 so that its position can be varied along the length of the adjusting screws and fixed in position after adjustment. A protruding extension 47 from the yoke 43 is connected to the bracket 44 so that a change in position of the bracket gives a consequent change in position of the yoke and hence the counter-weight 38. In use the counter-weight 38 is swung so that its center of mass is in line with the common center of rotation of the pitch and roll bearings 31 and 29 and the combined center of mass of the operator and seat assembly.

The distance of the center of mass of the counter-weight 38 from the seat support 33 and its total mass can also be adjusted so that the combined center of gravity of an operator, seat assembly and counter-weight is substantially at the common center of rotation of the roll and pitch bearings 29 and 31 respectively. With such an arrangement the seat assembly 27 can rotate a full 360° in roll generally as shown in phantom in FIG. 2. The pitch freedom in such a simulator is limited to about 155° due to interference between the seat support 33 and the front support member 23. Greater angles are readily provided by increasing the length of the front support member 23 and similar minor design changes.

The pitch and roll bearings are arranged to have a common center of rotation about three inches beneath the seat. This is quite near the center of mass of the operator and about as close as can be obtained without a yoke type suspensory system. A yoke type suspension is undesirable since it unduly interferes with free motion of the operator and is quite heavy, thereby affecting the inertia characteristics of the simulator. The heavy simulators mentioned hereinabove employ yoke type suspensory systems. It has been found that location of the pitch and roll axes at a short distance from the operator's center of gravity is without noticeable effect on studies of energy or force, or task training.

The significance of the parallelogram beam assembly becomes apparent when the limited pitch freedom of about 155° is considered. Because of the parallelogram beams, the front support member 23 remains in a fixed orientation, i.e. with the bearings 21 and 22 in a vertical line as illustrated in phantom in FIG. 1, despite changes in the position of the beams 18 and 19. Thus the axis of the roll bearing 29 remains horizontal in any position of vertical displacement of the seat assembly 27, and the cone of free motion of the seat assembly remains about a horizontal axis. An operator has the same pitch freedom in any vertical position with such an arrangement. If a simple beam were used in lieu of the parallelogram assembly, the axis of the roll bearing would tilt with the beam and the pitch freedom would be correspondingly limited. It will be apparent that the parallelogram of concern is that between the vertical column 11 and the front support member 23. The rear parallelogram between the column and the rear support member 26 is a convenient way to avoid changing the section of the beams rearward of the column and to keep the center of gravity of the simulator symmetrically located. The rear support member also keeps the counter-weight 28 from swinging and upsetting the inertia characteristics of the simulator in a dynamic situation. It will be appreciated that a single beam could be used rearwardly of the column 11 to support the counter-weight 28 or that the lengths of the beams could be different on opposite sides of the center pivot bearings 16 and 17 and the mass of the counter-weight 28 appropriately adjusted. Similarly a spring or motorized counterbalance can be employed in lieu of the counter-weight 28 on the rear end of the parallelogram, however, a non-linear device is required since the moment arm to the seat assembly 27 changes with vertical translation since an arcuate path is followed by the seat assembly. By having two similar parallelograms, the position of the counter-weight 28 relative to the support column is the same as the position of the seat assembly for any vertical displacement of the beams. Thus any need to compensate for the arcuate path of the seat assembly is obviated.

Thus a six degree of freedom simulator is provided with three degrees of translational freedom and three degrees of rotational freedom. Horizontal translational freedom in two degrees is limited only by the size of smooth floor space available. The vertical translational freedom in two degrees is limited only by the size of the beams 18 and 19 can swing before interfering with each other or other structural parts. In a typical simulator constructed according to the principles of this invention a total vertical freedom in excess of six feet is readily provided without excessive weight. Similarly full 360° rotational freedom is provided in the simulator in the roll and yaw directions. In excess of 150° of rotational freedom is provided in a pitch direction in a typical simulator constructed according to the principles of this invention. It will be appreciated that this is sufficient freedom in all degrees for study and simulation of most tasks an astronaut may be called upon to perform in the repair and maintenance of spacecraft in a zero gravity environment.

In operating a simulator as described hereinabove an operator is seated in the seat 34 and preferably secured in place by straps, seat belts and the like. For task training a smaller seat with less constraint of the operator may be desirable. The angular position of the counter-weight 38 beneath the seat and the distance of the counter-weight from the seat are adjusted so that the combined center of gravity of the operator, seat assembly, and counter-weight is at the common center of rotation of the pitch and roll bearings and the simulator is in equipoise in pitch and roll. The mass of the counter-weight 28 at the rear end of the simulator is then adjusted so that the combined center of gravity of the seat assembly, operator, and the counter-weight 28 is in a vertical line with the center support bearings 21 and 22 and the simulator is in equipoise in vertical translation. Compressed air is then provided to the air bearing pads 22 to provide the additional three degrees of freedom and an operator in the simulator is then in a substantially tractionless environment simulating zero gravity. The simulator is in complete equipoise and will remain in any given position or attitude, or, if set in motion, will remain in motion until stopped by another force.

A typical experimental procedure employing the six degree of freedom simulator may examine an elemental component of manual force such as pronation-supination, for example, rotation of a screwdriver or a large hand wheel such as might be found on a valve. It is found, for example, that an operator who can exert a torque of 120 foot-lbs. on a 21 inch diameter wheel in a normal tractive condition, may exert only 90 foot-lbs. torque in a simulator such as described. In a normal traction the force can be continued indefinitely and in simulated zero gravity on the simulator, the force can be exerted only momentarily until the inertia of the system is overcome and the operator moves.

In order to effectively eliminate the inertial effects of a simulator of the type described, extrapolations may be made from data collected with different simulator masses. Measurements are made with a minimum total weight of simulator so that the mass ratio, that is the ratio of the mass of the simulator plus the man, to the mass of the man alone is minimized. With a 730 pound loaded simulator and a 185 pound operator, a mass ratio of about 4.0 is obtained. Weight is then added to the simulator to vary the mass ratio and additional measurements are made of torque that the operator can apply, for example. By adding 250 pounds of weights to the simulator the mass ratio increases to about 5.3 and meaningful extrapolations can be made to lower mass ratios than can be obtained with the simulator alone. After data are obtained from a series of mass ratios, these data can then be extrapolated down to a mass ratio of 1.0, that is to the mass of man alone for energy measurements or down to a mass ratio of about 2.5 which is approximately the mass ratio of a suited astronaut with environmental and maneuvering units. Such an extrapolation with a low total weight simulator as provided in the practice of this invention is highly reliable whereas such extrapolations are virtually impossible with simulators inherently having a mass ratio of 25 or more, such as have been provided in prior art.

Obviously many modifications and variations of this invention may be practiced in light of the above teachings. It is therefore to be understood that within the scope of the appended claims the invention may be practiced otherwise than as specifically described.

What is claimed is:

1. A six degree of freedom apparatus comprising:
a base;
low friction support means for said base for providing two degrees of translational and one degree of rotational freedom in a horizontal plane;
first and second pivots spaced apart along a vertical line on said base;
first and second parallel beams each pivotably mounted on one side of said first and second pivots respectively;
third and fourth pivots on the ends of said first and second beams respectively;
a support member pivotably mounted on said third and fourth pivots to form a parallelogram, whereby said support member maintains a constant attitude regardless of pivotal displacement of said parallel beams;
gimbal means on said support member for providing one degree of rotational freedom about a horizontal axis and one degree of rotational freedom about an axis normal to the horizontal axis;
support means on said gimbal means; and
a counterweight on said gimbal means for maintaining said support means and an operator therein in equipoise, whereby said support means and said operator have six degrees of freedom independent of gravity.

2. A six degree of freedom apparatus comprising:
a base;
low friction support means for said base for providing two degrees of translational and one degree of rotational freedom in a horizontal plane;
first and second pivots spaced apart along a vertical line on said base;
first and second parallel beams each pivotably mounted on one side of said first and second pivots respectively;
third and fourth pivots on the ends of said first and second beams respectively;
a support member pivotably mounted on said third and fourth pivots to form a parallelogram, whereby said support member maintains a constant attitude regardless of pivotal displacement of said parallel beams;
gimbal means on said support member for providing one degree of rotational freedom about a horizontal axis and one degree of rotational freedom about an axis normal to the horizontal axis, and wherein said gimbal means comprises:
a first bearing on said support member;
a yoke member pivotably mounted on said first bearing for pivoting about a horizontal axis, and
a second bearing on said yoke member;
support means pivotably mounted on said second bearing for pivoting about an axis normal to and intersecting the horizontal axis at a common center of rotation and wherein:
the common center of rotation of said first and second bearings is external to the operator of the apparatus at a point adjacent the center of mass of the operator.

3. A six degree of freedom apparatus comprising:
a base;
low friction support means for said base for providing two degrees of translational and one degree of rotational freedom in a horizontal plane;
first and second pivots spaced along a vertical line on said base;
first and second parallel beams each pivotably mounted on one side of said first and second pivots respectively;
third and fourth pivots on the ends of said first and second beams respectively;
a support member pivotably mounted on said third and fourth pivots to form a parallelogram, whereby said support member maintains a constant attitude regardless of pivotal displacement of said parallel beams;
gimbal means on said support member for providing one degree of rotational freedom about a horizontal axis and one degree of rotational freedom about an axis normal to the horizontal axis and having a common center of rotation therewith support means for supporting an operator of the apparatus; and wherein
the common center of rotation about said horizontal axis and said axis normal to the horizontal axis is external to the operator of the apparatus at a point adjacent the center of mass of the operator.

4. A six degree of freedom apparatus as defined in claim 3 wherein said means for maintaining said support means in equipoise comprises:
a counter-weight mounted on said support means on the opposite side of said bearing means from said means for supporting an operator;
means for adjusting the distance of said counter-weight from said bearing means;
means for adjusting the angular position of said counter-weight relative to said means for supporting an operator.

5. A six degree of freedom apparatus as defined in claim 4 wherein said beam means further comprises:
parallel extensions of said first and second parallel beams on the other side of said first and second pivots from said third and fourth pivots respectively;
fifth and second pivots on the ends of said extensions of said first and second beams respectively;
a second support members pivotably mounted on said fifth and sixth pivots to form a second parallelogram similar to the first parallelogram; and
a counter-weight on said second support member for further maintaining the apparatus in equipoise.

6. A six degree of freedom simulator comprising:
a base structure;
air bearing pads on said base for levitating said base and for providing two degrees of translational freedom and one degree of rotational freedom in a horizontal plane;
a first center bearing on said base structure;
a second center bearing on said base structure and vertically above said first center bearing;
a first beam pivotably mounted at its mid-point on said first center bearing;
a second beam pivotably mounted at its mid-point on said second center bearing;
a first front bearing at a front end of said first beam;
a second front bearing at a front end of said second beam;
a front support member pivotably mounted on said first and second front bearings, the distance between said first and second front bearings being the same as the distance between the first and second center bearings, whereby said front support member maintains a constant attitude regardless of pivotal displacement of said first and second beams about said center bearings;
a roll bearing on said front support member;
a yoke member pivotably mounted on said roll bearing for pivoting about a horizontal axis;
pitch bearings on said yoke member;

support means pivotably mounted on said pitch bearings for pivoting about an axis normal to and intersecting the horizontal axis whereby said support means has six degrees of freedom;
a first rear bearing at a rear end of said first beam;
a second rear bearing at a rear end of said second beam;
a rear support member pivotably mounted on said first and second rear bearings, the distance between said first and second rear bearings being the same as the distance between said first and second center bearings, whereby said rear support member maintains a constant attitude regardless of pivotal displacement of said first and second beams; and
a counter-weight connected to said rear support member for maintaining said support means in equipoise about said first and second center bearings.

7. A six degree of freedom simulator comprising:
a base structure;
air bearing pads on said base for levitating said base and for providing two degrees of translational freedom and one degree of rotational freedom in a horizontal plane;
a first center bearing on said base structure;
a second center bearing on said base structure and vertically above said first center bearing;
a first beam pivotably mounted at its mid-point on said first center bearing;
a second beam pivotably mounted at its mid-point on said second center bearing;
a first front bearing at a front end of said first beam;
a second front bearing at a front end of said second beam;
a front support member pivotably mounted on said first and second front bearings, the distance between said first and second front bearings being the same as the distance between the first and second center bearings, whereby said front support member maintains a constant attitude regardless of pivotal displacement of said first and second beams about said center bearings;
a roll bearing on said front support member;
a yoke member pivotably mounted on said roll bearing for pivoting about a horizontal axis;
pitch bearings on said yoke member;
support means pivotably mounted on said pitch bearing for pivoting about an axis normal to and intersecting the horizontal axis whereby said support means has six degrees of freedom, said support means comprising:
a seat support member pivotably mounted on said pitch bearing;
a seat for an operator of the simulator on said seat support members;
a counter-weight rod mounted on said seat support member;
means for adjusting the angular position of said rod relative to said seat, and
an adjustable counter-weight on said rod for maintaining said support means in equipoise about said pitch and roll bearings said simulator further comprising:
a first rear bearing at a rear end of said first beam;
a second rear bearing at a rear end of said second beam;
a rear support member pivotably mounted on said first and second rear bearings, the distance between said first and second rear bearings being the same as the distance between said first and second center bearings, whereby said rear support member maintains a constant attitude regardless of pivotal displacement of said first and second beams; and
a counter-weight connected to said rear support member for maintaining said support means and an operator therein in equipoise about said first and second center bearings.

8. A simulator as defined in claim 7 wherein said base structure comprises:
a three legged base; and
an upstanding tubular support column on said base; and wherein
and air bearing pads are disposed at the ends of the legs of said base; and
said center bearings are at the upper end of said support column.

9. A multiple degree of freedom apparatus comprising:
a columnar support providing three degrees of freedom;
a parallelogram support mounted to the columnar support to provide freedom of motion in a vertical plane;
pitch and roll gimbal means mounted on an end of the parallelogram support remote from said columnar support;
an operator support carried by, and wholly external to the gimbal means; and
counterbalance means carried by the gimbal means for maintaining the gimbal means and operator support in equipoise.

References Cited
UNITED STATES PATENTS

| | | | |
|---|---|---|---|
| 1,193,994 | 8/1916 | Clayton | 272—54 |
| 1,928,519 | 9/1933 | Weisinger | 35—12 |
| 1,939,047 | 12/1933 | Gerhardt et al. | 35—12 |
| 2,305,207 | 12/1942 | Tigerman | 35—12 |
| 2,633,316 | 3/1953 | Woznack | 272—54 X |
| 3,161,968 | 12/1964 | De Boy et al. | 35—12 |

FOREIGN PATENTS
509,705    1955    Italy.

EUGENE R. CAPOZIO, *Primary Examiner.*

PAUL V. WILLIAMS, *Assistant Examiner.*

U.S. Cl. X.R.
272—30